United States Patent
Rodrigo et al.

(10) Patent No.: US 12,425,301 B2
(45) Date of Patent: Sep. 23, 2025

(54) HANDLING AN UPDATED NETWORK FUNCTION PROFILE

(71) Applicant: Telefonaktiebolaget LM Ericsson (publ), Stockholm (SE)

(72) Inventors: Maria Cruz Bartolome Rodrigo, Torremocha de Jarama Madrid (ES); Xinyu Zhang, Shanghai (CN); Yunjie Lu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 18/690,438

(22) PCT Filed: Sep. 30, 2022

(86) PCT No.: PCT/EP2022/077305
§ 371 (c)(1),
(2) Date: Mar. 8, 2024

(87) PCT Pub. No.: WO2023/052596
PCT Pub. Date: Apr. 6, 2023

(65) Prior Publication Data
US 2025/0007778 A1    Jan. 2, 2025

(51) Int. Cl.
*H04L 41/082* (2022.01)
*H04L 67/303* (2022.01)

(52) U.S. Cl.
CPC .......... *H04L 41/082* (2013.01); *H04L 67/303* (2013.01)

(58) Field of Classification Search
None
See application file for complete search history.

(56) References Cited

U.S. PATENT DOCUMENTS 10,043,220 B2    8/2018   Liu et al.
10,609,530 B1 *  3/2020   Patil .......................... G06F 8/65
(Continued)

FOREIGN PATENT DOCUMENTS

EP    0436194 A2    7/1991

OTHER PUBLICATIONS

Shetty et al., "Intelligent Strategies for Overload Detection & Handling for 5G Network", Oct. 1, 2021, IEEE, 2021 IEEE 4th 5G World Forum (5GWF) (2021, pp. 135-140) (Year: 2021).*

(Continued)

*Primary Examiner* — Davoud A Zand
(74) *Attorney, Agent, or Firm* — Murphy, Bilak & Homiller, PLLC

(57) ABSTRACT

There is provided a method for handling an updated profile of a first network function (NF) node of a service producer in a network. The method is performed by a network repository function (NRF) node. Priority information for the first NF node is removed (602) from the updated profile received from the first NF node if the NRF node previously changed the priority information. The priority information is for use by the network node in selecting an NF node of a service producer to provide a service requested by a second NF node of a service consumer. The priority information is indicative of a priority with which the first NF node is to be selected relative to at least one other NF node of the service producer. Transmission (604) of the updated profile, with the priority information removed, is initiated towards the network node.

20 Claims, 5 Drawing Sheets

(56) References Cited

U.S. PATENT DOCUMENTS

| | | | |
|---|---|---|---|
| 10,887,751 B1* | 1/2021 | Cakulev | H04W 4/029 |
| 2022/0086218 A1* | 3/2022 | Sabella | H04M 15/66 |
| 2023/0007536 A1* | 1/2023 | Sharma | H04W 28/088 |

OTHER PUBLICATIONS

3GPP, "3GPP TS 23.502 V17.2.1", 3rd Generation Partnership Project; Technical Specification Group Services and System Aspects; Procedures for the 5G System (5GS); Stage 2 (Release 17), Sep. 2021, 1-712.

3GPP, "3GPP TS 29.510 V17.2.0", 3rd Generation Partnership Project; Technical Specification Group Core Network and Terminals; 5G System; Network Function Repository Services; Stage 3 (Release 17), Jun. 2021, 1-256.

3GPP "3GPP TS 29.510 V17.3.0", 3rd Generation Partnership Project; Technical Specification Group Core Network and Terminals; 5G System; Network Function Repository Services; Stage 3 (Release 17), Sep. 2021, 1-271.

3GPP, "3rd Generation Partnership Project; Technical Specification Group Core Network and Terminals; 5G System; Network Function Repository Services; Stage 3 (Release 16)", 3GPP TS 29.510 V16.5.0, Sep. 2020, 1-195.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, 1-430.

Thomson, M., et al., "Hypertext Transfer Protocol Version 2 (HTTP 2)", draft-ietf-httpbis-http2bis-05, HTTPbis, Internet-Draft, Intended Status: Standards Track, Sep. 26, 2021, 1-88.

* cited by examiner

HANDLING AN UPDATED NETWORK FUNCTION PROFILE

TECHNICAL FIELD

The disclosure relates to methods for handling an updated profile of a network function node of a service producer in a network, and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 v16.4.0. In more detail, FIGS. 1A and 1B illustrate systems that use direct communication, while FIGS. 1C and 1D illustrate systems that use indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF) node. Thus, in the system illustrated in FIG. 1B, the NF node of the service consumer can query the NRF node to discover suitable NF nodes of the service producer to which to send the service request. In response to such a query, the NF node of the service consumer can receive an NF profile for one or more NF nodes of the service producer and, based on the received NF profile(s) can select an NF node of the service producer to which to send the service request. In the system illustrated in FIG. 1A, the NRF node is not used and instead the NF node of the service consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP node. Similarly, any subsequent service requests are sent indirectly from the NF node of the service consumer to the NF node of the service producer via the SCP node. The systems illustrated in FIGS. 1C and 1D also comprise an NRF node.

In the system illustrated in FIG. 1C, the NF node of the service consumer can query the NRF node to discover suitable NF nodes of the service producer to which to send the service request. In response to such a query, the NF node of the service consumer can receive an NF profile for one or more NF nodes of the service producer and, based on the received NF profile(s) can select an NF node of the service producer to which to send the service request. In this case, the service request sent from the NF node of the service consumer to the SCP node comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP node may communicate with the NRF node to acquire selection parameters (e.g. location, capacity, etc.) and the SCP node may select an NF node of the service producer to which to send the service request.

In the system illustrated in FIG. 1D, the NF node of the service consumer does not carry out the discovery or selection process. Instead, the NF node of the service consumer adds any necessary discovery and selection parameters (required to find a suitable NF node of the service producer) to the service request that it sends via the SCP node. The SCP node uses the request address and the discovery and selection parameters in the service request to route the service request to a suitable NF node of the service producer. The SCP node can perform discovery with the NRF node.

For the fifth generation core (5GC), from Release 16, the SCP node is included as a network element to allow indirect communication between an NF node of a service consumer and an NF node of a service producer. The indirect communication that is used can be either of the two indirect communications options described earlier with reference to FIGS. 1C and 1D.

Each of the techniques illustrated in FIGS. 1B, 1C and 1D involve a discovery process for discovering NF nodes of a service producer and this involves the NF node of the service consumer receiving an NF profile of one or more NF nodes of the service producer for use in selecting an NF node of the service producer to which to send a service request. The NF node of the service consumer may receive, in a discovery response, one or multiple NF service producer profiles, e.g. of functionally equivalent NF service producer instances. An NF service producer profile can include a priority value that can be used by the NF node of the service consumer to perform selection (or reselection) among the provided NF service producer profiles.

However, it may be the case that an NF profile of one or more NF nodes of the service producer is updated. For example, the NRF node may overwrite the priority value in an NF profile of one or more NF nodes of the service producer. Specifically, this is stated in the definition of "type NFProfile" provided in Table 6.1.6.2.2-1 of 3GPP 29,510 V17.2.0 as follows:

| Attribute name | Data type | P | Cardinality | Description |
|---|---|---|---|---|
| priority | integer | O | 0 . . . 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute. Priority in xxxInfo parameter shall only be used to determine the relative priority among NF instances with the same priority at NFProfile/NFService. The NRF may overwrite the received priority value when exposing an NFProfile with the Nnrf_NFDiscovery service. |

Thus, the NRF node may overwrite the priority value in a registered NF profile based on the last sentence in the above table. The criteria on the basis of which the priority value can be modified by the NRF node may remain, until the NRF node modifies it. The criteria on the basis of which the priority value can be modified by the NRF node is not standardized. However, whatever the intervention of the NRF node in the priority value, the intervention affects the selection (or reselection) of an NF node of a service producer. An issue that can arise as a result of this is illustrated in FIG. 2.

FIG. 2 is a signalling diagram illustrating an exchange of signals in an existing system. The system illustrated in FIG. 2 comprises a first NF node 30 of a service producer ("NFp1"), at least one other first NF node 70 of a service producer ("NFp2"), a second NF node 20 of a service consumer ("NFc"), and an NRF node 60.

As illustrated by arrow 100 of FIG. 2, the first NF node 30 transmits a first register request ("Nnrf_NFMng_NFRegister_req") towards the NRF node 60 and the NRF node 60 receives the first register request. The first register request 100 is a request for the NRF node 60 to register the first NF node 30 as an NF node of a service producer that is capable of providing a service. The first register request 100 comprises a profile of the first NF node 30 and this profile comprises a priority value of "3". As illustrated by arrow 102 of FIG. 2, the NRF node 60 transmits a response to the first register request towards the first NF node 30 and the first NF node 30 receives this response 102.

As illustrated by arrow 104 of FIG. 2, another first NF node 70 transmits of a second register request ("Nnrf_NFMng_NFRegister_req") towards the NRF node 60 and the NRF node 60 receives the second register request. The second register request 104 is a request for the NRF node 60 to register the other first NF node 70 as an NF node of a service producer that is capable of providing a service. The second register request 104 comprises a profile of the other first NF node 70 and this profile comprises a priority value of "2". As illustrated by arrow 106 of FIG. 2, the NRF node 60 transmits a response to the second register request towards the other first NF node 70 and the other first NF node 70 receives this response 106.

As illustrated by arrow 108 of FIG. 2, the second NF node 20 transmits a discovery request ("Nnrf_NFDisc req") towards the NRF node 60 and the NRF node 60 receives the discovery request. The discovery request 108 is a request for the NRF node 60 to discover NF nodes of a service producer. As illustrated by block 110 of FIG. 2, the NRF node 60 may change the priority value for the first NF node 30 and/or the other first NF node 70, e.g. based on some criteria. Specifically, the priority value for the first NF node 30 is changed from "3" to "1" and the priority value for the other first NF node 70 remains as "2".

As illustrated by arrow 112 of FIG. 2, the NRF node 60 transmits a response ("Nnrf_NFDisc rsp") to the discovery request 108 towards the second NF node 20 and the second NF node 20 receives this response. The response 112 comprises the profile of the discovered first NF node 30 and other first NF node 70. The profiles comprise the priority value for the respective first NF nodes 30, 70, which is the changed priority value in the case of the first NF node 30. As illustrated at block 114 of FIG. 2, the first NF node 30 is preferred based on these priority values and is thus selected by the second NF node 20.

As illustrated by arrow 116 of FIG. 2, the second NF node 20 transmits a subscription request ("Nnrf_NFMng_NFStatusSubs req") towards the NRF node 60 and the NRF node 60 receives the subscription request. The subscription request 116 is a request for the second NF node 20 to be notified if there is a change to an NF profile of a first NF node 30, 70. As illustrated by arrow 118 of FIG. 2, the NRF node 60 transmits of a response to this subscription request 116 towards the second NF node 20 and the second NF node 20 receives the response 118.

There is an update to a profile of a first NF node 30, e.g. an update to the attribute "AllowedNFtypes". As illustrated by arrow 120 of FIG. 2, the first NF node 30 transmits a registration request towards the NRF node 60 and the NRF node 60 receives the registration request. The registration request 120 comprises the updated profile for the first NF node 30 and requests that it is registered. The first NF node 30 provides the original priority value of "3" in the profile. As illustrated by arrow 122 of FIG. 2, the NRF node 60 transmits a response to the registration request 120 towards the first NF node 30 and the first NF node 30 receives the response 122.

As illustrated by arrow 124 of FIG. 2, the NRF node 60 transmits a notification comprising the updated NF profile for the first NF node 30 towards the subscribed second NF node 20 and the second NF node 20 receives the notification. As illustrated by arrow 126 of FIG. 2, the second NF node 20 transmits a response to the notification towards the NRF node 60. As illustrated by block 128 of FIG. 2, the other first NF node 70 is preferred based on the priority value of "3" for the first NF node 30 received in the updated profile for the first NF node 30 compared to the priority value of "2" previously received for the other first NF node 30. Thus, the other first NF node 70 is selected by the second NF node 20.

Effectively, the priority value for the first NF node 30 received at step 112 (following the change by the NRF node 60 at block 110) is overwritten by the priority value provided directly by the first NF node 30. As such, the ordering criteria that NRF node 60 is interested in by altering priority is spoilt.

SUMMARY

It is an object of the disclosure to obviate or eliminate at least some of the above-described disadvantages associated with existing techniques.

According to the existing techniques, once a profile of an NF node of a service producer is discovered by an NF node of a service consumer, the NF node of the service consumer normally subscribes to be notified if the profile is modified. Then, if the profile is changed for any reason, the updated profile needs to be notified to the NF node of the service consumer. The NF node of the service consumer receives the updated NF profile with the original priority value and not the one that resulted from a change by the NRF node. As a result, the purpose of the altered priority value by the NRF node 60 is spoilt. It has thus been realised that an improved method for handling such an updated profile of an NF node of a service producer is needed.

Therefore, according to an aspect of the disclosure, there is provided a method for handling an updated profile of a first NF node of a service producer in a network. The method is performed by an NRF node. The method comprises removing priority information for the first NF node from the updated profile received from the first NF node if the NRF node previously changed the priority information. The priority information is for use by the network node in selecting an NF node of a service producer to provide a service requested by a second NF node of a service consumer. The priority information is indicative of a priority with which the first NF node is to be selected relative to at least one other NF node of the service producer. The method comprises initiating transmission of the updated profile, with the priority information removed, towards the network node.

According to another aspect of the disclosure, there is also provided an NRF node comprising processing circuitry configured to operate in accordance with the method described in respect of the NRF node. In some embodiments, the NRF node may comprise at least one memory for storing instructions which, when executed by the processing circuitry, cause the NRF node to operate in accordance with the method described in respect of the NRF node.

According to another aspect of the disclosure, there is also provided another method for handling an updated profile of a first NF node of a service producer in a network. The method is performed by a network node. The method comprises, in response to receiving the updated profile of the first NF node from a NRF node, identifying whether the updated profile comprises priority information for the first NF node for use by the network node in selecting an NF node of a service producer to provide a service requested by a second NF node of a service consumer. The method comprises, if the updated profile does not comprise priority information for the first NF node, maintaining previously acquired priority information for the first NF node in selecting an NF node of a service producer to provide the service. The previously acquired priority information for the first NF node is priority information acquired for the first NF node from the NRF node prior to the profile of the first NF node being updated.

According to another aspect of the disclosure, there is provided a network node comprising processing circuitry configured to operate in accordance with the method described in respect of the network node. In some embodiments, the network node may comprise at least one memory for storing instructions which, when executed by the processing circuitry, cause the network node to operate in accordance with the method described in respect of the network node.

According to another aspect of the disclosure, there is provided a method performed by a system. The method comprises the method described in respect of the NRF node and the method described in respect of the network node.

According to another aspect of the disclosure, there is provided a system comprising at least one NRF node as described earlier and at least one network node as described earlier.

According to another aspect of the disclosure, there is provided a computer program comprising instructions which, when executed by processing circuitry, cause the processing circuitry to perform the method described in respect of the NRF node and/or the method described in respect of the network node.

According to another aspect of the disclosure, there is provided a computer program product, embodied on a non-transitory machine-readable medium, comprising instructions which are executable by processing circuitry to cause the processing circuitry to perform the method described in respect of the NRF node and/or the method described in respect of the network node.

Thus, in the manner described, the NRF node that performs a modification of the priority information in the profile of the first NF node provides the updated profile (e.g. as a result of a subscription to NF profile changes) without including the priority information. This is interpreted by the network node that receives the updated profile as an indication that the previously acquired (and e.g. cached) priority information for the first NF node is still valid and is not to be modified. Thus, the NRF node may alter the priority information in the profile of the first NF node and that alteration is still valid even if the profile is modified (e.g. as long as the changes in the profile do not require a change the priority information). In this way, changes to the NF profile of the first NF node do not spoil the altered priority feature provided by the NRF node. The ordering of first NF nodes provided by the NRF node is not spoilt.

Therefore, there is provided an improved technique for handling an updated profile of a first NF node of a service producer in a network.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

Some of the embodiments contemplated herein will now be described more fully with reference to the accompanying drawings. Other embodiments, however, are contained within the scope of the subject-matter disclosed herein, the disclosed subject-matter should not be construed as limited to only the embodiments set forth herein; rather, these embodiments are provided by way of example to convey the scope of the subject-matter to those skilled in the art.

Herein, techniques for handling an updated profile of a first network function (NF) node of a service producer in a network are described.

The techniques described herein can be used in respect of any network, such as any communications or telecommunications network, e.g. cellular network. The network may be a fifth generation (5G) network or any other generation network. In some embodiments, the network may be a core network or a radio access network (RAN). The techniques are implemented by a network repository function (NRF) node and a network node. The network node referred to herein may be a second NF node of a service consumer or a first service communication proxy (SCP) node. The first SCP node is a node that is configured to operate as an SCP between the second NF node and the NRF node. Generally, an NRF node is a node that provides NF service registration and discovery. An NRF node thus enables NF nodes to identify services offered by other NF nodes. Further definitions of an NRF node are provided in 3GPP TS 29.510 V16.5.0 and V17.2.0 and the NRF node described herein may be capable of operating in accordance with any of the methods described therein.

An NF is a third generation partnership project (3GPP) adopted, or 3GPP defined, processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios. Herein, references to a plurality of NF nodes of a service producer may refer to, for example, functionally equivalent instances of NF nodes of the service producer.

Figure 1:
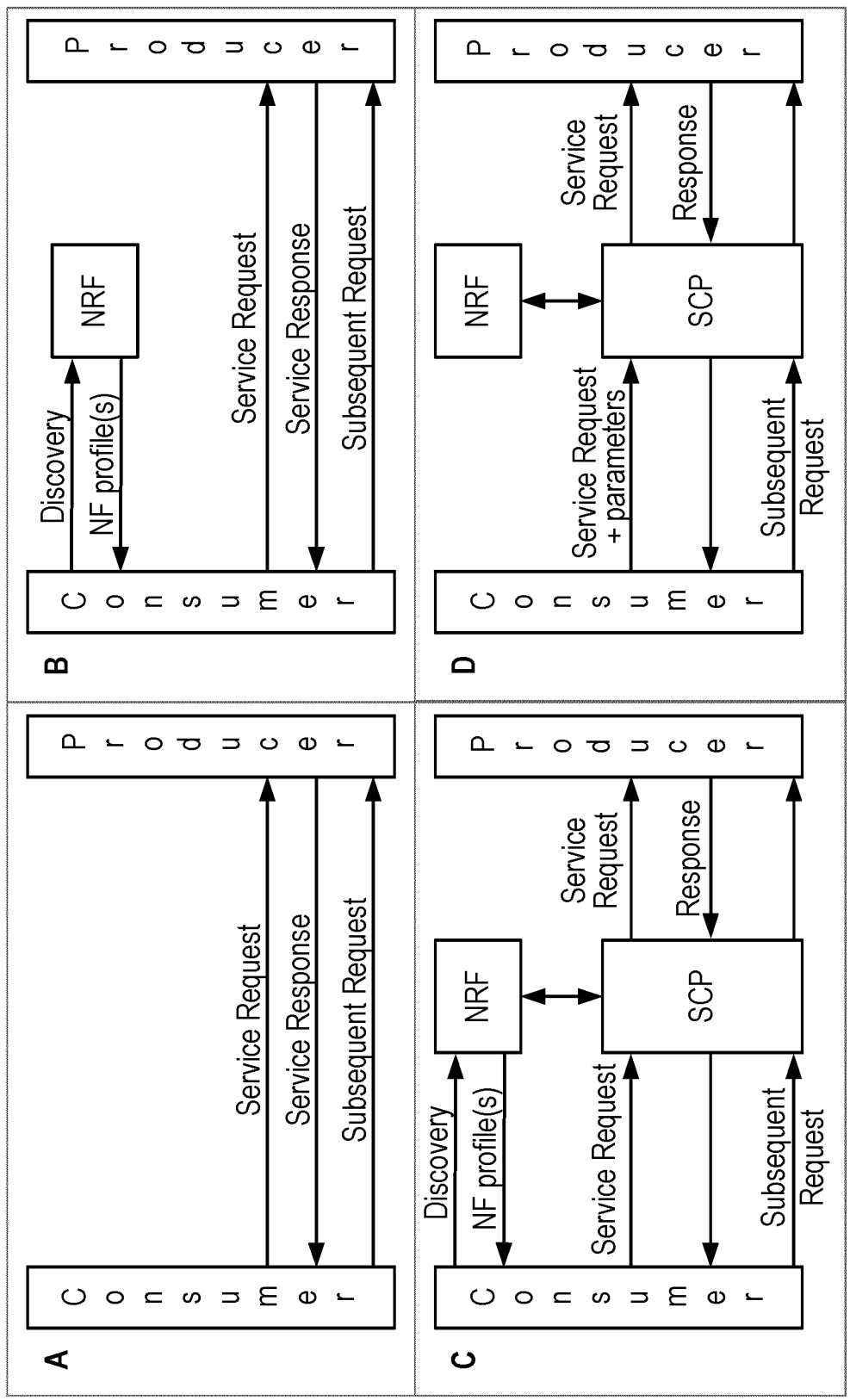
FIG. 1A-D is a block diagram illustrating different existing systems.
Figure 2:
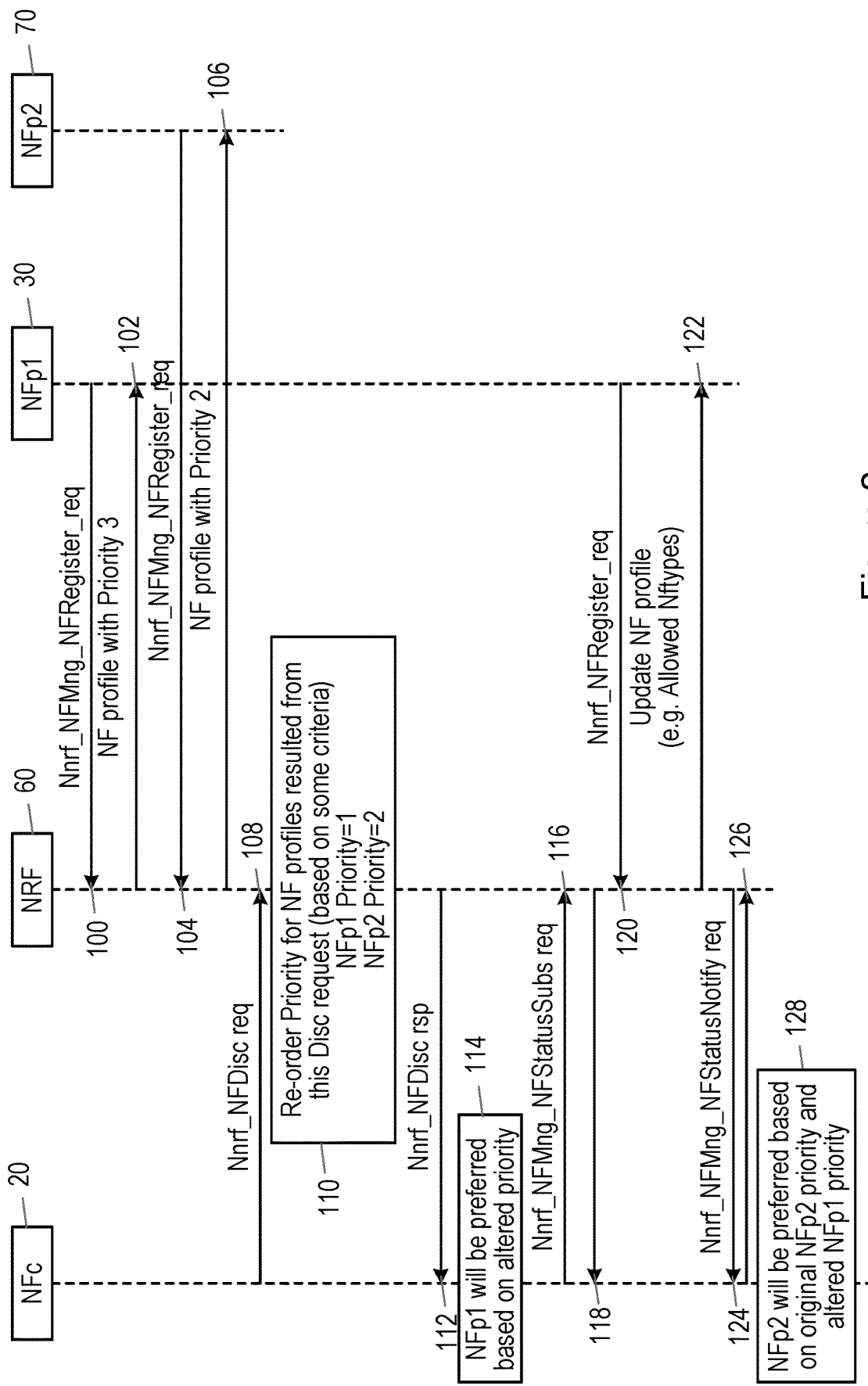
FIG. 2 is a signalling diagram illustrating an exchange of signals in an existing system.
Figure 3:
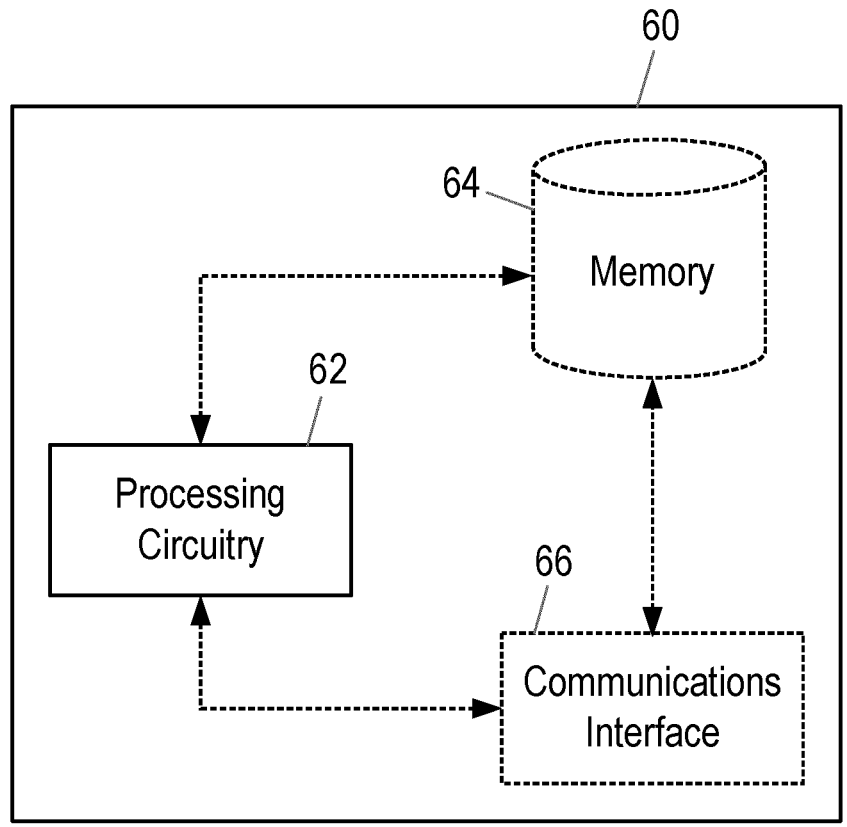
FIG. 3 is a block diagram illustrating an NRF node according to an embodiment.

FIG. 3 illustrates a network repository function (NRF) node 60 in accordance with an embodiment. The NRF node 60 is for handling an updated profile of a first NF node of a service producer in a network. In some embodiments, the NRF node 60 can, for example, be a physical machine (e.g. a server) or a virtual machine (VM).

As illustrated in FIG. 3, the NRF node 60 comprises processing circuitry (or logic) 62. The processing circuitry 62 controls the operation of the NRF node 60 and can implement the method described herein in respect of the NRF node 60. The processing circuitry 62 can be configured or programmed to control the NRF node 60 in the manner described herein. The processing circuitry 62 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the NRF node 60. In some embodiments, the processing circuitry 62 can be configured to run software to perform the method described herein in respect of the NRF node 60. The software may be containerised according to some embodiments. Thus, in some embodiments, the processing circuitry 62 may be configured to run a container to perform the method described herein in respect of the NRF node 60.

Briefly, the processing circuitry 62 of the NRF node 60 is configured to remove priority information for the first NF node from the updated profile received from the first NF node if the NRF node previously changed the priority information. The priority information is for use by the network node in selecting an NF node of a service producer to provide a service requested by a second NF node of a service consumer. The priority information is indicative of a priority with which the first NF node is to be selected relative to at least one other NF node of the service producer. The processing circuitry 62 of the NRF node 60 is configured to initiate transmission of the updated profile, with the priority information removed, towards the network node.

As illustrated in FIG. 3, in some embodiments, the NRF node 60 may optionally comprise a memory 64. The memory 64 of the NRF node 60 can comprise a volatile memory or a non-volatile memory. In some embodiments, the memory 64 of the NRF node 60 may comprise a non-transitory media. Examples of the memory 64 of the NRF node 60 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 62 of the NRF node 60 can be connected to the memory 64 of the NRF node 60. In some embodiments, the memory 64 of the NRF node 60 may be for storing program code or instructions which, when executed by the processing circuitry 62 of the NRF node 60, cause the NRF node 60 to operate in the manner described herein in respect of the NRF node 60. For example, in some embodiments, the memory 64 of the NRF node 60 may be configured to store program code or instructions that can be executed by the processing circuitry 62 of the NRF node 60 to cause the NRF node 60 to operate in accordance with the method described herein in respect of the NRF node 60. Alternatively or in addition, the memory 64 of the NRF node 60 can be configured to store any information, data, messages, requests, responses, indications, notifications, signals, or similar, that are described herein. The processing circuitry 62 of the NRF node 60 may be configured to control the memory 64 of the NRF node 60 to store information, data, messages, requests, responses, indications, notifications, signals, or similar, that are described herein.

In some embodiments, as illustrated in FIG. 3, the NRF node 60 may optionally comprise a communications interface 66. The communications interface 66 of the NRF node 60 can be connected to the processing circuitry 62 of the NRF node 60 and/or the memory 64 of NRF node 60. The communications interface 66 of the NRF node 60 may be operable to allow the processing circuitry 62 of the NRF node 60 to communicate with the memory 64 of the NRF node 60 and/or vice versa. Similarly, the communications interface 66 of the NRF node 60 may be operable to allow the processing circuitry 62 of the NRF node 60 to communicate with the first NF node, the network node (e.g. the second NF node and/or first SCP node), and/or any other node.

The communications interface 66 of the NRF node 60 can be configured to transmit and/or receive information, data, messages, requests, responses, indications, notifications, signals, or similar, that are described herein. In some embodiments, the processing circuitry 62 of the NRF node 60 may be configured to control the communications interface 66 of the NRF node 60 to transmit and/or receive information, data, messages, requests, responses, indications, notifications, signals, or similar, that are described herein.

Although the NRF node 60 is illustrated in FIG. 3 as comprising a single memory 64, it will be appreciated that the NRF node 60 may comprise at least one memory (i.e. a single memory or a plurality of memories) 64 that operate in the manner described herein. Similarly, although the NRF node 60 is illustrated in FIG. 3 as comprising a single communications interface 66, it will be appreciated that the NRF node 60 may comprise at least one communications interface (i.e. a single communications interface or a plurality of communications interface) 66 that operate in the manner described herein. It will also be appreciated that FIG. 3 only shows the components required to illustrate an embodiment of the NRF node 60 and, in practical implementations, the NRF node 60 may comprise additional or alternative components to those shown.

Figure 4:
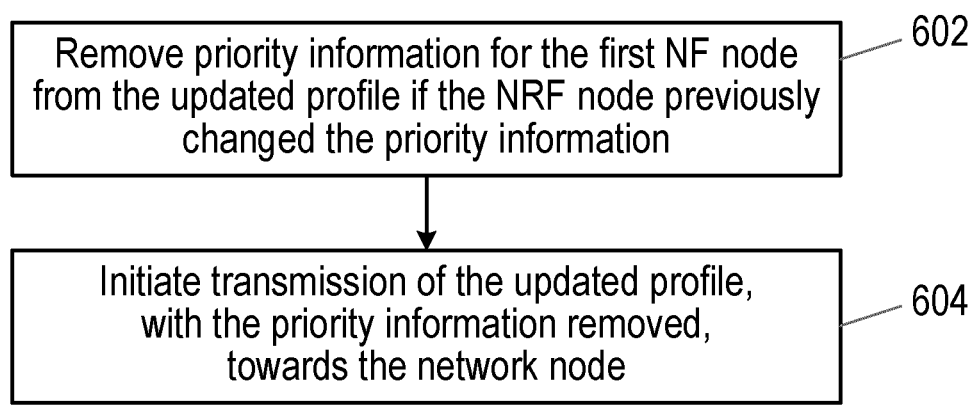
FIG. 4 is a flowchart illustrating a method performed by an NRF node according to an embodiment.

FIG. 4 is a flowchart illustrating a method performed by an NRF node 60 in accordance with an embodiment. The method is for handling an updated profile of a first NF node of a service producer in a network. The NRF node 60 described earlier with reference to FIG. 3 is configured to operate in accordance with the method of FIG. 4. The method can be performed by or under the control of the processing circuitry 62 of the NRF node 60.

As illustrated at block 602 of FIG. 4, priority information for the first NF node is removed from the updated profile received from the first NF node if the NRF node previously changed the priority information. In 3GPP, it is not mandatory to include priority information in an NF profile. That is, priority information is optionally included in an NF profile. As such, it is possible to omit the priority information for the first NF node from the updated profile of the first NF node.

The priority information is for use by the network node in selecting an NF node of a service producer to provide (e.g. execute or run) a service requested by a second NF node of a service consumer. The priority information is indicative of a priority with which the first NF node is to be selected relative to at least one other NF node of the service producer. The priority information referred to herein may also be referred to as a priority attribute. In some embodiments, the priority information referred to herein may be a value, such as an integer value. For example, it may be that the lowest value (e.g. 1) is indicative of the highest priority and the highest value (e.g. 65535) is indicative of the lowest priority. This value may also be referred to herein as a priority value.

Herein, a service can be software intended to be managed for users. The service referred to herein can be any type of service, such as a communication service (e.g. a notification service or a callback service), a context management (e.g. user equipment context management (UECM)) service, a data management (DM) service, or any other type of service.

As illustrated at block 604 of FIG. 4, transmission of the updated profile, with the priority information removed, is initiated towards the network node. Herein, the term "initiate" can mean, for example, cause or establish. Thus, the processing circuitry 62 of the NRF node 60 can be configured to itself transmit the updated profile towards the network node (e.g. via a communications interface 66 of the NRF node 60) or can be configured to cause another node to transmit the updated profile towards the network node.

In some embodiments, the priority information for the first NF node may be removed from the updated profile provided that the updated profile does not comprise a change to one or more attributes in the profile on which the priority information is based. In some embodiments, if the updated profile comprises a change to one or more attributes in the profile on which the priority information is based, the method may comprise updating the priority information in the updated profile based on the change that the updated profile comprises and initiating transmission of the updated profile, comprising the updated priority information, towards the network node. For example, there may be a change to one or more attributes other than priority, which necessitates a change to priority. In some embodiments, the change that the updated profile comprises may be made at the first NF node or the NRF node 60. In some embodiments, the first NF node and/or the NRF node 60 may change the profile via operations and maintenance (O&M), e.g. after the profile has been stored/cached at the NRF node 60.

In some embodiments, the priority information for the first NF node may be removed from the updated profile provided that the updated profile does not comprise a change to the priority information in the profile. In some embodiments, if the updated profile comprises a change to the priority information in the profile, the method may comprise initiating transmission of the updated profile, with the change to the priority information, towards the network node. Thus, there may be a change to the priority itself. In some embodiments, the change to the priority information in the profile may be made at the first NF node or the NRF node 60. In some embodiments, the first NF node and/or the NRF node 60 may change the priority information via operations and maintenance (O&M), e.g. after the priority information has been stored/cached at the NRF node 60.

In some embodiments, the method may comprise initiating transmission of the updated profile, comprising the priority information, towards the network node if the NRF node 60 has not previously changed the priority information.

In some embodiments, the network node may be subscribed to receive the updated profile.

Figure 5:
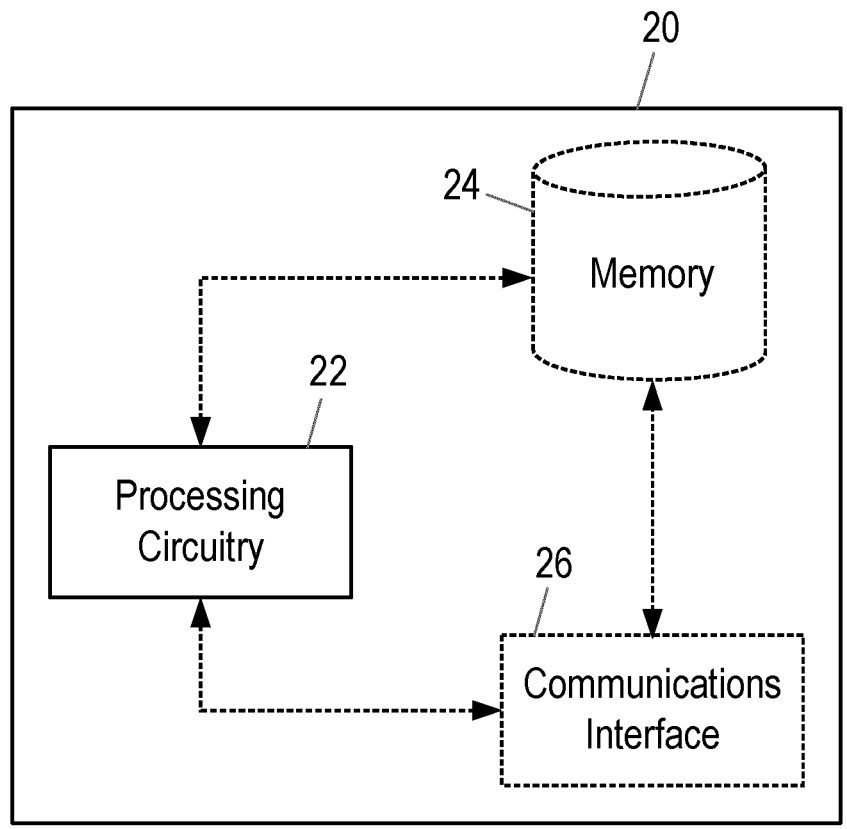
FIG. 5 is a block diagram illustrating a network node according to an embodiment.

FIG. 5 illustrates a network node 20 in accordance with an embodiment. The network node 20 is for handling an updated profile of a first NF node of a service producer in a network. The network node can be the second NF node 20 of the service consumer or a first SCP node. The first SCP node is configured to operate as an SCP between the second NF node and the NRF node 60. In some embodiments, the network node 20 (e.g. the second NF node and/or the first SCP node) can, for example, be a physical machine (e.g. a server) or a virtual machine (VM). The second NF node 20 can be, for example, a user equipment (UE).

As illustrated in FIG. 5, the network node 20 comprises processing circuitry (or logic) 22. The processing circuitry 22 controls the operation of the network node 20 and can implement the method described herein in respect of the network node 20. The processing circuitry 22 can be configured or programmed to control the network node 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the network node 20. In some embodiments, the processing circuitry 22 can be configured to run software to perform the method described herein in respect of the network node 20. The software may be containerised according to some embodiments. Thus, in some embodiments, the processing circuitry 22 may be configured to run a container to perform the method described herein in respect of the network node 20.

Briefly, the processing circuitry 22 of the network node 20 is configured to, in response to receiving the updated profile of the first NF node from the NRF node 60, identify whether the updated profile comprises priority information for the first NF node for use by the network node in selecting an NF node of a service producer to provide a service requested by the second NF node 20 of the service consumer. The processing circuitry 22 of the network node 20 is configured to, if the updated profile does not comprise priority information for the first NF node, maintain previously acquired priority information for the first NF node in selecting an NF node of a service producer to provide the service. The previously acquired priority information for the first NF node is priority information acquired for the first NF node from the NRF node 60 prior to the profile of the first NF node being updated.

As illustrated in FIG. 5, in some embodiments, the network node 20 may optionally comprise a memory 24. The memory 24 of the network node 20 can comprise a volatile memory or a non-volatile memory. In some embodiments, the memory 24 of the network node 20 may comprise a non-transitory media. Examples of the memory 24 of the network node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the network node 20 can be connected to the memory 24 of the network node 20. In some embodiments, the memory 24 of the network node 20 may be for storing program code or instructions which, when executed by the processing circuitry 22 of the network node 20, cause the network node 20 to operate in the manner described herein in respect of the network node 20. For example, in some embodiments, the memory 24 of the network node 20 may be configured to store program code or instructions that can be executed by the processing circuitry 22 of the network node 20 to cause the network node 20 to operate in accordance with the method described herein in respect of the network node 20. Alternatively or in addition, the memory 24 of the network node 20 can be configured to store any information, data, messages, requests, responses, indications, notifications, signals, or similar, that are described herein. The processing circuitry 22 of the network node 20 may be configured to control the memory 24 of the network node 20 to store information, data, messages, requests, responses, indications, notifications, signals, or similar, that are described herein.

In some embodiments, as illustrated in FIG. 5, the network node 20 may optionally comprise a communications interface 26. The communications interface 26 of the network node 20 can be connected to the processing circuitry 22 of the network node 20 and/or the memory 24 of network node 20. The communications interface 26 of the network node 20 may be operable to allow the processing circuitry 22 of the network node 20 to communicate with the memory 24 of the network node 20 and/or vice versa. Similarly, the communications interface 26 of the network node 20 may be operable to allow the processing circuitry 22 of the network node 20 to communicate with the NRF node 60, the first NF node, the second NF node, and/or any other node. The communications interface 26 of the network node 20 can be configured to transmit and/or receive information, data, messages, requests, responses, indications, notifications, signals, or similar, that are described herein. In some embodiments, the processing circuitry 22 of the network node 20 may be configured to control the communications interface 26 of the network node 20 to transmit and/or receive information, data, messages, requests, responses, indications, notifications, signals, or similar, that are described herein.

Although the network node 20 is illustrated in FIG. 5 as comprising a single memory 24, it will be appreciated that the network node 20 may comprise at least one memory (i.e. a single memory or a plurality of memories) 24 that operate in the manner described herein. Similarly, although the network node 20 is illustrated in FIG. 5 as comprising a single communications interface 26, it will be appreciated that the network node 20 may comprise at least one communications interface (i.e. a single communications interface or a plurality of communications interface) 26 that operate in the manner described herein. It will also be appreciated that FIG. 5 only shows the components required to illustrate an embodiment of the network node 20 and, in practical implementations, the network node 20 may comprise additional or alternative components to those shown.

Figure 6:
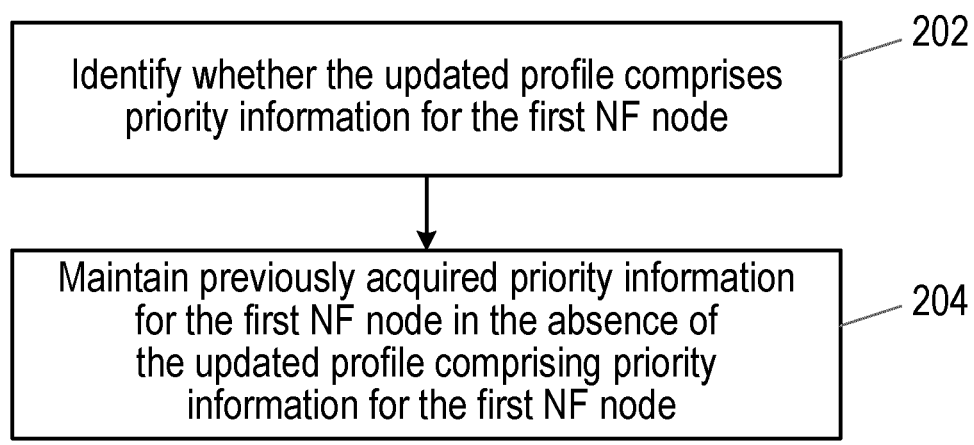
FIG. 6 is a flowchart illustrating a method performed by a network node according to an embodiment.

FIG. 6 is a flowchart illustrating a method performed by a network node 20 in accordance with an embodiment. As mentioned earlier, the network node 20 can be the second NF node of a service consumer, or a first SCP node that is configured to operate as an SCP between the second NF node and the NRF node 60. The method is for handling an updated profile of a first NF node of a service producer in a network. The network node 20 described earlier with reference to FIG. 5 is configured to operate in accordance with the method of FIG. 6. The method can be performed by or under the control of the processing circuitry 22 of the network node 20.

As illustrated at block 202 of FIG. 6, in response to receiving the updated profile of the first NF node from the NRF node 60, it is identified whether the updated profile comprises priority information for the first NF node for use by the network node 20 in selecting an NF node of a service producer to provide (e.g. execute or run) a service requested by the second NF node 20 of the service consumer.

As illustrated at block 204 of FIG. 6, if the updated profile does not comprise priority information for the first NF node, previously acquired priority information for the first NF node is maintained in selecting an NF node of a service producer to provide the service. The previously acquired priority information for the first NF node is priority information acquired for the first NF node from the NRF node 60 prior to the profile of the first NF node being updated. In some embodiments, the previously acquired priority information for the first NF node may be stored in (and thus retrieved from) a memory.

In some embodiments, the method may comprise selecting an NF node of a service producer to provide the service based on the previously acquired priority information for the first NF node. The selection can be based on the previously acquired priority information for the first NF node alone or together with one or more other attributes for the first NF node, e.g. a location of the first NF node, a load on the first NF node, a capacity of the first NF node, and/or any other attribute, or any combination of attributes. Thus, the priority information can be the primary attribute used for selection but other attributes may be used as well. This may be the case, for example, where there are multiple instances of the first NF node with the same previously acquired priority information. Alternatively, in such a situation, a random selection may be used to select between the multiple instances of the first NF node.

In some embodiments, the method may comprise selecting the first NF node to provide the service if the previously acquired priority information for the first NF node is indicative that the priority with which the first NF node is to be selected is higher than the priority with which the at least one other node is to be selected. In some embodiments, the method may comprise, if the updated profile comprises priority information for the first NF node, using the priority information for the first NF node that the updated profile comprises in selecting an NF node of a service producer to provide the service. In some embodiments, the method may comprise selecting an NF node of a service producer to provide the service based on the priority information for the first NF node that the updated profile comprises. In some embodiments, the method may comprise selecting the first NF node to provide the service if the priority information for the first NF node that the updated profile comprises is indicative that the priority with which the first NF node is to be selected is higher than the priority with which the at least one other node is to be selected.

In some embodiments, the network node 20 may be subscribed to receive the updated profile from the NRF node 60.

There is also provided a method performed by a system. The method comprises the method described herein in respect of the network node 20 and the method described herein in respect of the NRF node 60. There is also provided a system comprising at least one network node 20 as described herein and at least one NRF node 60 as described herein.

Figure 7:
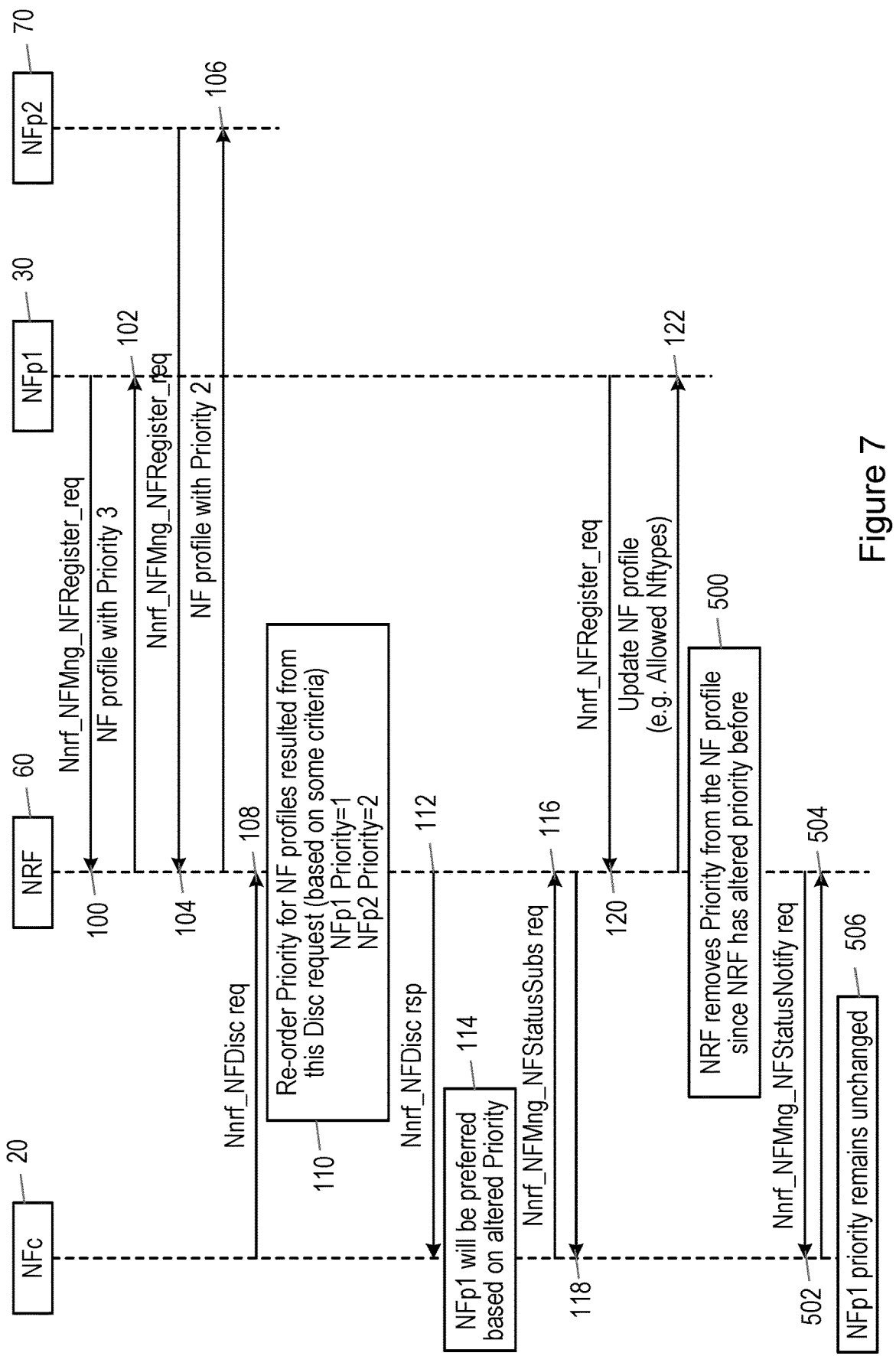
FIG. 7 is a signalling diagram illustrating an exchange of signals in a system according to an embodiment.

FIG. 7 is a signalling diagram illustrating an exchange of signals in a system according to an embodiment. The system illustrated in FIG. 7 comprises a network node 20 and an NRF node 60. The system illustrated in FIG. 7 may optionally also comprise a first NF node 30 of a service producer ("NFp1"). The system illustrated in FIG. 7 may optionally also comprise at least one other first NF node 70 of the service producer ("NFp2"). The first NF node 30 and the at least one other first NF node 70 can each be configured to provide (e.g. execute or run) a service. The first NF node 30 and the at least one other first NF node 70 can be part of a set of NF nodes of a service producer according to some embodiments. Although two first NF nodes 30, 70 are illustrated, the system illustrated in FIG. 7 can comprise one or more first NF nodes.

As illustrated in FIG. 7, the network node 20 can be a second NF node of a service consumer ("NFc") according to some embodiments. However, in other embodiments (not illustrated), the network node 20 can be a first SCP node. Thus, the method described herein with respect to the second NF node 20 may instead be performed by the first SCP node. In these embodiments, the first SCP node is configured to operate as an SCP between second NF node 20 and the NRF node 60. Similarly, a second SCP node may be configured to operate as an SCP between the NRF node 60 and any one or more of the first NF nodes 30, 70.

In some embodiments where the system comprises the first SCP node, an entity may comprise the first SCP node and the NRF node 60. That is, in some embodiments, the first SCP node can be merged with the NRF node 60 in a combined entity. In some embodiments where the system comprises the second SCP node, an entity may comprise the second SCP node and the NRF node 60. That is, in some embodiments, the second SCP node can be merged with the NRF node 60 in a combined entity. The system illustrated in FIG. 7 can comprise one or more SCP nodes according to some embodiments.

In some embodiments, the first SCP node and the second NF node 20 may be deployed in independent deployment units, and/or the first SCP node and the NRF node 60 may be deployed in independent deployment units. Thus, an SCP node based on independent deployment units is possible, as described in 3GPP TS 23.501 V16.4.0. In other embodiments, the first SCP node may be deployed as a distributed network element. For example, in some embodiments, part (e.g. a service agent) of the first SCP node may be deployed in the same deployment unit as the second NF node 20, and/or part (e.g. a service agent) of the first SCP node may be deployed in the same deployment unit as the NRF node 60. Thus, an SCP node based on a service mesh is possible, as described in 3GPP TS 23.501 V16.4.0.

In some embodiments, the second SCP node and any one or more of the first NF nodes 30, 70 may be deployed in independent deployment units, and/or the second SCP node and the NRF node 60 may be deployed in independent deployment units. Thus, an SCP node based on independent deployment units is possible, as described in 3GPP TS 23.501 V16.4.0. In other embodiments, the second SCP node may be deployed as a distributed network element. For example, in some embodiments, part (e.g. a service agent) of the second SCP node may be deployed in the same deployment unit as any one or more of the first NF nodes 30, 70, and/or part (e.g. a service agent) of the second SCP node may be deployed in the same deployment unit as the NRF node 60. Thus, an SCP node based on a service mesh is possible, as described in 3GPP TS 23.501 V16.4.0.

In some embodiments, at least one third SCP node may be configured to operate as an SCP between the second NF node 20 and the first SCP node, and/or at least one fourth SCP node may be configured to operate as an SCP between the first SCP node and the NRF node 60. Similarly, in some embodiments, at least one fifth SCP node may be configured to operate as an SCP between the NRF node 60 and the second SCP node, and/or at least one sixth SCP node may be configured to operate as an SCP between the second SCP node and any one or more of the first NF nodes 30, 70. Thus, a multipath of SCP nodes is possible. In some of these embodiments, the first SCP node and one or more of the at least one third SCP node and the at least one fourth SCP node may be deployed in independent deployment units. In some embodiments, the at least one third SCP node and/or the at least one fourth SCP node may be deployed as distributed network elements. In some embodiments, the second SCP node and one or more of the at least one fifth SCP node and the at least one sixth SCP node may be deployed in independent deployment units. In some embodiments, the at least one fifth SCP node and/or the at least one sixth SCP node may be deployed as distributed network elements.

Registration of the first NF nodes 30, 70 in the NRF node 60 is performed, with certain priority information, as determined by the first NF nodes 30, 70. In more detail, as illustrated by arrow 100 of FIG. 7, the first NF node 30 initiates transmission of a first register request ("Nnrf_NFMng_NFRegister_req") towards the NRF node 60. The first register request 100 may be transmitted directly from the first NF node 30 to the NRF node 60 (as illustrated in FIG. 7) or indirectly from the first NF node 30 to the NRF node 60, e.g. via the second SCP node. The NRF node 60 receives the first register request 100. The first register request 100 is a request for the NRF node 60 to register the first NF node 30. For example, the first register request 100 can be a request for the NRF node 60 to register the first NF node 30 as an NF node of a service producer that is capable of providing a service.

As illustrated in FIG. 7, the first register request 100 can comprise a profile of the first NF node 30. The profile of the first NF node 30 can comprise priority information (e.g. a priority value, "Priority 3") for the first NF node 30. The priority information is for use by the network node 20 in selecting an NF node of a service producer to provide (e.g. execute or run) a service requested by the second NF node. The priority information is indicative of a priority with which the first NF node 30 is to be selected relative to at least one other first NF node 70.

As illustrated by arrow 102 of FIG. 7, the NRF node 60 initiates transmission of a first register response towards the first NF node 30. The first register response 102 may be transmitted directly from the NRF node 60 to the first NF node 30 (as illustrated in FIG. 7) or indirectly from the NRF node 60 to the first NF node 30, e.g. via the second SCP node. The first NF node 30 receives the first register response 102. The first register response 102 is a response to the first register request 100. For example, the first register response 102 can be a response indicative that the NRF node 60 has registered the first NF node 30, e.g. as an NF node of a service producer that is capable of providing a service.

As illustrated by arrow 104 of FIG. 7, at least one other first NF node 70 initiates transmission of a second register request ("Nnrf_NFMng_NFRegister_req") towards the NRF node 60. The second register request 104 may be transmitted directly from the at least one other first NF node 70 to the NRF node 60 (as illustrated in FIG. 7) or indirectly from the at least one other first NF node 70 to the NRF node 60, e.g. via the second SCP node. The NRF node 60 receives the second register request 104. The second register request 104 is a request for the NRF node 60 to register the at least one other first NF node 70. For example, the second register request 104 can be a request for the NRF node 60 to register the at least one other first NF node 70 as an NF node of a service producer that is capable of providing a service.

As illustrated in FIG. 7, the second register request 104 can comprise a profile of the at least one other first NF node 70. The profile of the at least one other first NF node 70 can comprise priority information (e.g. a priority value, "Priority 2") for the at least one other first NF node 70. The priority information is for use by the network node 20 in selecting an NF node of a service producer to provide (e.g. execute or run) a service requested by the second NF node. The priority information is indicative of a priority with which the first NF nodes 30, 70 are to be selected relative to each other. For example, a first NF node 70 that has the highest priority (e.g. indicated by the lower priority value, "Priority 2") may be selected.

As illustrated by arrow 106 of FIG. 7, the NRF node 60 initiates transmission of a second register response towards the at least one other first NF node 70. The second register response 106 may be transmitted directly from the NRF node 60 to the at least one other first NF node 70 (as illustrated in FIG. 7) or indirectly from the NRF node 60 to the at least one other first NF node 70, e.g. via the second SCP node. The at least one other first NF node 70 receives the second register response 106. The second register response 106 is a response to the second register request 104. For example, second the register response 106 can be a response indicative that the NRF node 60 has registered the at least one other first NF node 70, e.g. as an NF node of a service producer that is capable of providing a service.

As illustrated by arrow 108 of FIG. 7, the network node 20 initiates transmission of a discovery request ("Nnrf_NF-Disc req") towards the NRF node 60. This network node 20 is the second NF node in the embodiment illustrated in FIG. 7. The discovery request 108 may be transmitted directly from the second NF node 20 to the NRF node 60 (as illustrated in FIG. 7) or indirectly from the second NF node 20 to the NRF node 60, e.g. via the first SCP node. The NRF node 60 receives the discovery request 108. The discovery request 108 is a request for information indicative of one or more first NF nodes 30, 70 for providing a service requested by the second NF node 20. The NRF node 60 receives the discovery request 108.

As illustrated by block 110 of FIG. 7, the NRF node 60 may change (e.g. modify or alter) the priority information for one or more of the first NF nodes 30, 70 in respect of which a profile was received. The priority information for one or more of the first NF nodes 30, 70 may be changed based on (or according to) one or more criteria. Thus, the results derived for the discovery request 108 can be subject to a change to (e.g. a modification or alteration of) the priority information, e.g. according to one or more criteria. The discovery request 108 may comprise the one or more criteria. The one or more criteria may be any one or more of a location of each first NF node 30, 70, a load on each first NF node 30, 70, a capacity of each first NF node 30, 70, and/or any other criterion, or any combination of criteria.

For example, in embodiments where the one or more criteria comprise a location of each first NF node 30, 70, the NRF node 60 may change the priority information for one or more of the first NF nodes 30, 70 such that the first NF nodes 30, 70 are prioritised according to this criterion by assignment of a highest priority (e.g. a lowest priority value) to one or more of the first NF nodes 30, 70 that are located at a predefined location. The predefined location can, for example, be a predefined geographic location, a predefined data center, or any other predefined location. In some embodiments, the predefined location may be the same location as the network node 20 (e.g. the second NF node or the first SCP node). For example, a first NF node located at the same location as the network node 20 may be preferred over a first NF node located at a different location from the network node 20. In some embodiments, the predefined location may be the closest location to the network node 20 (e.g. the second NF node or the first SCP node). In this way, it is possible to improve signalling and latency in the system.

Alternatively or in addition, in embodiments where the one or more criteria comprise the load on each first NF node 30, 70, the NRF node 60 may change the priority information for one or more of the first NF nodes 30, 70 such that the first NF nodes 30, 70 are prioritised according to this criterion by assignment of a highest priority (e.g. a lowest priority value) to one or more of the first NF nodes 30 that have the lowest load. Alternatively or in addition, in embodiments where the one or more criteria comprise the capacity of each first NF node 30, 70, the NRF node 60 may change the priority information for one or more of the first NF nodes 30, 70 such that the first NF nodes 30, 70 are prioritised according to this criterion by assignment of a highest priority (e.g. a lowest priority value) to one or more of the first NF nodes 30, 70 that have the greatest available capacity.

In an example, as illustrated in FIG. 7, the priority information for the first NF node 30 may be changed from a priority value of "3" to a priority value of "1" and the priority information for the at least one other first NF node 70 may remain the same as a priority value of "2". Thus, the priority may be reordered. As mentioned before, the priority information is indicative of a priority with which the first NF nodes 30, 70 are to be selected relative to each other. Thus, for example, following the change to the priority information, a first NF node 30 that has the highest priority (e.g. indicated by the lower priority value of "1") may be selected. The change to the priority information can thus result in a change to the first NF node that is selected.

The NRF node 60 can thus prioritise the first NF nodes 30, 70 by assignment of priority information (e.g. a priority value) to each of the first NF nodes 30, 70, e.g. according to the criterion. In this way, the first NF nodes 30, 70 can be ordered (or ranked). As the NRF 60 is capable of changing priority information, in some cases, the assigned priority information can be different to that which was received in the NF profile for any one or more of the first NF nodes 30, 70.

As illustrated by arrow 112 of FIG. 7, the NRF node 60 initiates transmission of a discovery response ("Nnrf_NF-Disc rsp") towards the network node 20 that initiated transmission of the discovery request 108 towards the NRF node 60. This network node 20 is the second NF node in the embodiment illustrated in FIG. 7. The discovery response 112 may be transmitted directly from the NRF node 60 to the second NF node 20 (as illustrated in FIG. 7) or indirectly from the NRF node 60 to the second NF node 20, e.g. via the first SCP node. The second NF node 20 receives the discovery response. The discovery response 112 comprises information indicative of any first NF nodes 30, 70 identified for providing the service requested by the second NF node 20. This information can also be referred to as the discovery results. For any identified first NF nodes 30, 70, the information can comprise a profile of the first NF node. Thus, NF profile(s) resulting from the discovery request 108 can be returned. A profile of a first NF node can comprise information that allows the second NF node 20 to target the first NF node, such as information identifying the first NF node (e.g. an identifier that identifies the first NF node, such as an NF instance identifier), location information for the first NF node (e.g. NF instance location information), and/or any other such information.

In other embodiments, where there are no first NF nodes identified for providing the service, the information comprised in the discovery response 112 may be an error message indicative that no first NF nodes are identified for providing the service. In some embodiments, the error message may comprise a newly defined error code, i.e. an error code that is not already associated with an error in the art. The newly defined error code can be specifically indicative that no first NF nodes are identified for providing the service. In other embodiments, the error message may comprise an existing error code, i.e. an error code already associated with another error in the art. However, in these embodiments, the error code may also be associated with information indicative that no first NF nodes are identified for providing the service.

If a plurality of first NF nodes 30, 70 are identified for providing the service requested by the second NF node 20, the discovery response 112 can comprise the (e.g. changed) priority information assigned by the NRF node 60 to each first NF node of the plurality of first NF nodes 30, 70. For example, in embodiments where the discovery response 112 comprises a profile of each of these first NF nodes 30, 70, the profile may comprise the (e.g. changed) priority information assigned by the NRF node 60 to that first NF node. Thus, the profile of each of these first NF nodes 30, 70 may be returned with the (e.g. changed) priority information.

As mentioned earlier, the priority information is for use by the network node 20 in selecting an NF node of a service producer to provide the service requested by the second NF node 20 and the priority information is indicative of a priority with which the first NF node 30 is to be selected relative to at least one other NF node 70 of the service producer. Thus, as illustrated by block 114 of FIG. 7, the second NF node 20 may perform the step of selecting one or more first NF nodes from any identified first NF nodes 30, 70 according to the priority information assigned to the identified first NF nodes 30, 70 (and optionally also other information). As illustrated in FIG. 7, in this example, the first NF node 30 is selected over the at least one other first NF node 70 as this is the first NF node that is preferred based on the (e.g. changed) priority information. In particular, in the example, the first NF node 30 having the lowest priority value is selected. Although block 114 of FIG. 7 illustrates a selection of one or more first NF nodes, it will be understood that this may instead be a reselection of one or more first NF nodes if a selection of one or more first NF nodes has already been performed.

As illustrated by arrow 116 of FIG. 7, the network node 20 initiates transmission of a subscription request ("Nnrf_NFMng_NFStatusSubs req") towards the NRF node 60. This network node 20 is the second NF node in the embodiment illustrated in FIG. 7. The subscription request 116 may be transmitted directly from the second NF node 20 to the NRF node 60 (as illustrated in FIG. 7) or indirectly from the second NF node 20 to the NRF node 60, e.g. via the first SCP node. The NRF node 60 receives the subscription request 116. The subscription request 116 is a request for the second NF node 20 to be notified if there is a change to an NF profile of a first NF node 30, 70.

As illustrated by arrow 118 of FIG. 7, the NRF node 60 initiates transmission of a subscription response towards the network node 20. This network node 20 is the second NF node in the embodiment illustrated in FIG. 7. The subscription response 118 may be transmitted directly from the NRF node 60 to the second NF node 20 (as illustrated in FIG. 7) or indirectly from the NRF node 60 to the second NF node 20, e.g. via the first SCP node. The second NF node 20 receives the subscription response 118. The subscription response 118 is a response to the subscription request 116. For example, the subscription response 118 can be a response indicative that the second NF node 20 is successfully subscribed to be notified if there is a change to an NF profile of a first NF node 30, 70.

In the embodiment illustrated in FIG. 7, there is an update to a profile of a first NF node 30. For example, an attribute (e.g. AllowedNFtypes) in the profile of the first NF node 30 may be modified. As illustrated by arrow 120 of FIG. 7, the first NF node 30 initiates transmission of a registration request towards the NRF node 60. The registration request 120 may be transmitted directly from the first NF node 30 to the NRF node 60 (as illustrated in FIG. 7) or indirectly from the first NF node 30 to the NRF node 60, e.g. via the second SCP node. The NRF node 60 receives the registration request 120. The registration request 120 is a request to register the updated profile of the first NF node 30. As illustrated by arrow 120 of FIG. 7, the registration request 120 comprises the updated profile for the first NF node 30. The first NF node 30 may provide priority information (e.g. a priority value, such as a priority value of "3") in the profile.

As illustrated by arrow 122 of FIG. 7, the NRF node 60 initiates transmission of a registration response towards the first NF node 30. The registration response 122 may be transmitted directly from the NRF node 60 to the first NF node 30 (as illustrated in FIG. 7) or indirectly from the NRF node 60 to the first NF node 30, e.g. via the second SCP node. The first NF node 30 receives the registration response 122. The registration response 122 is a response to the registration request 122. For example, the registration request 122 can be a response indicative that the NRF node 60 has registered the updated profile of the first NF node 30.

As illustrated by arrow 500 of FIG. 7, the NRF node 60 removes the priority information for the first NF node 30 from the updated profile received from the first NF node 30 if the NRF node 60 previously changed the priority information at block 110 of FIG. 7. As illustrated by arrow 502 of FIG. 7, the NRF node 60 initiates transmission of the updated profile, with the priority information removed (i.e. excluding the priority information), towards the network node 20. This network node 20 is the (subscribed) second NF node in the embodiment illustrated in FIG. 7. The updated profile may be transmitted directly from the NRF node 60 to the second NF node 20 (as illustrated in FIG. 7) or indirectly from the NRF node 60 to the second NF node 20, e.g. via the first SCP node. The second NF node 20 receives the updated profile, with the priority information removed. Thus, the NRF node 60 that changed the priority information does not include priority information in the updated NF profile of the first NF node 30. An exception to this may be where the first NF node 30 changes specifically the priority information.

As illustrated by arrow 502 of FIG. 7, the NRF node 60 may initiate transmission of a notification request ("Nnrf_NFMng_NFStatusNotify req") towards the network node 20.

This network node 20 is the (subscribed) second NF node in the embodiment illustrated in FIG. 7. The notification request 502 may be transmitted directly from the NRF node 60 to the second NF node 20 (as illustrated in FIG. 7) or indirectly from the NRF node 60 to the second NF node 20, e.g. via the first SCP node. The notification request 502 may comprise the updated profile of the first NF node 30. The notification request can be a request to notify the second NF node 20 that the profile of the first NF node 30 has been updated. As illustrated by arrow 504 of FIG. 7, the network node 20 may initiate transmission of a notification response towards the NRF node 60. This network node 20 is the second NF node in the embodiment illustrated in FIG. 7. The notification response 504 may be transmitted directly from the second NF node 20 to the NRF node 60 (as illustrated in FIG. 7) or indirectly from the second NF node 20 to the NRF node 60, e.g. via the first SCP node. The NRF node 60 receives the notification response 504. The notification response 504 is a response to the notification request 502. For example, the notification response 504 can be a response indicative that the second NF node 20 has successfully been notified that the profile of the first NF node 30 has been updated.

As mentioned before, the priority information is for use by the network node 20 in selecting an NF node of a service producer to provide the service requested by the second NF node and the priority information is indicative of a priority with which the first NF node 30 is to be selected relative to at least one other first NF node 70 of the service producer. In response to receiving the updated profile of the first NF node 30 from the NRF node 60, the network node 20 identifies whether the updated profile comprises priority information for the first NF node 30 for use by the network node 20 in selecting an NF node of a producer to provide the service. If the updated profile does not comprise priority information for the first NF node 30, the network node maintains previously acquired priority information for the first NF node 30 in selecting an NF node of a producer to provide the service. The previously acquired priority information for the first NF node 30 is priority information acquired for the first NF node 30 from the NRF node 60 (at arrow 112 of FIG. 7) prior to the profile of the first NF node 30 being updated. In the embodiment illustrated in FIG. 7, the updated profile does not comprise priority information for the first NF node 30. That is, priority information for the first NF node 30 is not included in the updated profile.

Thus, as illustrated by block 506 of FIG. 7, the priority information for the first NF node 30 remains unchanged. As a result, the ordering criteria that the NRF node 60 is interested in by changing the priority information (at block 110 of FIG. 7) remains valid.

There is also provided a computer program comprising instructions which, when executed by processing circuitry (such as the processing circuitry 22 of the network node 20 described earlier and/or the processing circuitry 62 of the NRF node 60 described earlier), cause the processing circuitry to perform at least part of the method described herein. There is provided a computer program product, embodied on a non-transitory machine-readable medium, comprising instructions which are executable by processing circuitry (such as the processing circuitry 22 of the network node 20 described earlier and/or the processing circuitry 62 of the NRF node 60 described earlier) to cause the processing circuitry to perform at least part of the method described herein. There is provided a computer program product comprising a carrier containing instructions for causing processing circuitry (such as the processing circuitry 22 of the network node 20 described earlier and/or the processing circuitry 62 of the NRF node 60 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the network node functionality and/or the NRF node functionality described herein can be performed by hardware. Thus, in some embodiments, any one or more of the network node 20 and the NRF node 60 described herein can be a hardware node. However, it will also be understood that optionally at least part or all of the network node functionality and/or the NRF node functionality described herein can be virtualized. For example, the functions performed by any one or more of the network node 20 and the NRF node 60 described herein can be implemented in software running on generic hardware that is configured to orchestrate the node functionality. Thus, in some embodiments, any one or more of the network node 20 and the NRF node 60 described herein can be a virtual node. In some embodiments, at least part or all of the network node functionality and/or the NRF node functionality described herein may be performed in a network enabled cloud.

The network node functionality and/or the NRF node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there are advantageously provided improved techniques for handling an updated profile of a first NF node of a service producer in a network.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling an updated profile of a first network function (NF) node of a service producer in a network, wherein the method is performed by a network repository function (NRF) node, the method comprising:
   removing priority information for the first NF node from the updated profile received from the first NF node if the NRF node previously changed the priority information, wherein the priority information is for use by a network node in selecting an NF node of a service producer to provide a service requested by a second NF node of a service consumer and the priority information is indicative of a priority with which the first NF node is to be selected relative to at least one other NF node of the service producer; and
   initiating transmission of the updated profile, with the priority information removed, towards the network node.

2. The method as claimed in claim 1, wherein the priority information for the first NF node is removed from the updated profile provided that the updated profile does not comprise a change to one or more attributes in a profile on which the priority information is based.

3. The method as claimed in claim 2, wherein, if the updated profile comprises a change to one or more attributes in the profile on which the priority information is based, the method comprises:
   updating the priority information in the updated profile based on the change that the updated profile comprises; and
   initiating transmission of the updated profile, comprising the updated priority information, towards the network node.

4. The method as claimed in claim 2, wherein the change that the updated profile comprises is made at the first NF node or the NRF node.

5. The method as claimed in claim 1, wherein the priority information for the first NF node is removed from the updated profile provided that the updated profile does not comprise a change to the priority information in the profile.

6. The method as claimed in claim 5, wherein, if the updated profile comprises a change to the priority information in the profile, the method comprises initiating transmission of the updated profile, with the change to the priority information, towards the network node.

7. The method as claimed in claim 5, wherein the change to the priority information in the profile is made at the first NF node or the NRF node.

8. The method as claimed in claim 1, the method comprising initiating transmission of the updated profile, comprising the priority information, towards the network node if the NRF node has not previously changed the priority information.

9. The method as claimed in claim 1, wherein the network node is subscribed to receive the updated profile.

10. The method as claimed in claim 1, wherein:
    the network node is the second NF node; or
    the network node is a first service communication proxy (SCP) node that is configured to operate as an SCP between the second NF node and the NRF node.

11. A method for handling an updated profile of a first network function (NF) node of a service producer in a network, wherein the method is performed by a network node, the method comprising:
    in response to receiving the updated profile of the first NF node from a network repository function (NRF) node, identifying whether the updated profile comprises priority information for the first NF node for use by the network node in selecting an NF node of a service producer to provide a service requested by a second NF node of a service consumer; and
    if the updated profile does not comprise priority information for the first NF node, maintaining previously acquired priority information for the first NF node in selecting an NF node of a service producer to provide the service, wherein the previously acquired priority information for the first NF node is priority information acquired for the first NF node from the NRF node prior to a profile of the first NF node being updated.

12. The method as claimed in claim 11, wherein the previously acquired priority information for the first NF node is stored in a memory.

13. The method as claimed in claim 11, the method comprising selecting an NF node of a service producer to provide the service based on the previously acquired priority information for the first NF node.

14. The method as claimed in claim 13, the method comprising selecting the first NF node to provide the service if the previously acquired priority information for the first NF node is indicative that a priority with which the first NF node is to be selected is higher than a priority with which the at least one other node is to be selected.

15. The method as claimed in claim 11, the method comprising, if the updated profile comprises priority information for the first NF node, using the priority information for the first NF node that the updated profile comprises in selecting an NF node of a service producer to provide the service.

16. The method as claimed in claim 15, the method comprising selecting an NF node of a service producer to provide the service based on the priority information for the first NF node that the updated profile comprises.

17. The method as claimed in claim 16, the method comprising selecting the first NF node to provide the service if the priority information for the first NF node that the updated profile comprises is indicative that a priority with which the first NF node is to be selected is higher than a priority with which the at least one other node is to be selected.

18. The method as claimed in claim 11, wherein:
    the network node is the second NF node; or
    the network node is a first service communication proxy (SCP) node that is configured to operate as an SCP between the second NF node and the NRF node.

19. A network repository function (NRF) node comprising:
    processing circuitry configured for handling an updated profile of a first network function (NF) node of a service producer in a network, the processing circuitry configured to:

remove priority information for the first NF node from the updated profile received from the first NF node if the NRF node previously changed the priority information, wherein the priority information is for use by a network node in selecting an NF node of a service producer to provide a service requested by a second NF node of a service consumer and the priority information is indicative of a priority with which the first NF node is to be selected relative to at least one other NF node of the service producer; and initiate transmission of the updated profile, with the priority information removed, towards the network node.

20. A network node comprising:

processing circuitry configured for handling an updated profile of a first network function (NF) node of a service producer in a network, the processing circuitry configured to:

in response to receiving the updated profile of the first NF node from a network repository function (NRF) node, identifying whether the updated profile comprises priority information for the first NF node for use by the network node in selecting an NF node of a service producer to provide a service requested by a second NF node of a service consumer; and if the updated profile does not comprise priority information for the first NF node, maintaining previously acquired priority information for the first NF node in selecting an NF node of a service producer to provide the service, wherein the previously acquired priority information for the first NF node is priority information acquired for the first NF node from the NRF node prior to a profile of the first NF node being updated.

* * * * *